(12) United States Patent
Lee

(10) Patent No.: US 12,039,137 B2
(45) Date of Patent: Jul. 16, 2024

(54) SYSTEM AND METHOD FOR RECOGNIZING POSITION OF AUTOMOTIVE DISPLAY

(71) Applicant: HYUNDAI MOBIS CO., LTD., Seoul (KR)

(72) Inventor: Jung Young Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/146,551

(22) Filed: Dec. 27, 2022

(65) Prior Publication Data

US 2024/0061534 A1 Feb. 22, 2024

(30) Foreign Application Priority Data

Aug. 17, 2022 (KR) .................. 10-2022-0102625

(51) Int. Cl.
*G06F 3/044* (2006.01)
*B60K 35/00* (2024.01)
*B60K 35/10* (2024.01)
*B60K 35/22* (2024.01)

(52) U.S. Cl.
CPC .............. *G06F 3/044* (2013.01); *B60K 35/00* (2013.01); *B60K 35/10* (2024.01); *B60K 35/22* (2024.01); *B60K 2360/1434* (2024.01); *G06F 2203/04104* (2013.01)

(58) Field of Classification Search
None
See application file for complete search history.

(56) References Cited

U.S. PATENT DOCUMENTS

| | | | |
|---|---|---|---|
| 2016/0132140 A1 | 5/2016 | Ding et al. | |
| 2016/0266674 A1 | 9/2016 | Schropp, Jr. | |
| 2018/0081473 A1 | 3/2018 | Seo et al. | |
| 2018/0181231 A1* | 6/2018 | Ishikura | G06F 3/0488 |
| 2021/0206266 A1* | 7/2021 | Shim | B60K 37/00 |
| 2023/0013804 A1* | 1/2023 | Kang | G01B 7/32 |

FOREIGN PATENT DOCUMENTS

KR 00681072 B1 2/2007

OTHER PUBLICATIONS

Extended European Search Report issued on Aug. 14, 2023 in corresponding European patent application No. 22216927.8.

* cited by examiner

*Primary Examiner* — Christopher R Lamb
(74) *Attorney, Agent, or Firm* — NovoTechIP International PLLC

(57) ABSTRACT

The present invention relates to a system and method for recognizing a position of an automotive display. The system for recognizing a position of an automotive display according to the present invention includes an automotive display having a touch sensor disposed on one side thereof, conductors that are disposed inside a vehicle cockpit to generate a change in capacitance for the touch sensor, and a control unit that obtains touch data according to the change in capacitance, analyzes a touch input pattern, and calculates position coordinate data and touch coordinate data of the automotive display.

20 Claims, 13 Drawing Sheets

SIDE VIEW

FIG. 1A
[DOWN] 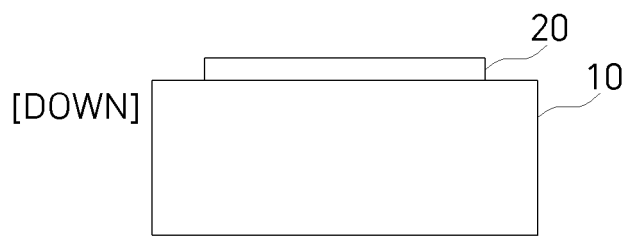
[UP] 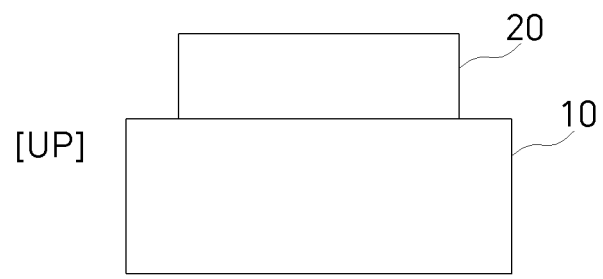
FRONT VIEW

SIDE VIEW

FIG. 3A
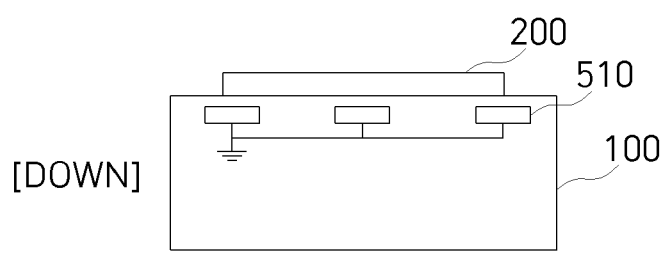
[DOWN]
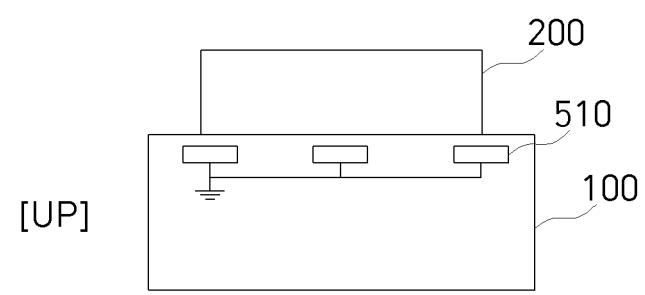
[UP]
FRONT VIEW

FRONT VIEW

SIDE VIEW

SYSTEM AND METHOD FOR RECOGNIZING POSITION OF AUTOMOTIVE DISPLAY

CROSS-REFERENCE TO RELATED APPLICATION

This application claims priority to and the benefit of Korean Patent Application No. 10-2022-0102625 filed on Aug. 17, 2022, the disclosure of which is incorporated herein by reference in its entirety.

TECHNICAL FIELD

The present invention relates to a system and method for recognizing a position of an automotive display.

BACKGROUND

Various displays used in automobiles are collectively called an automotive display. Automobiles are changing from a simple means of transportation to a space that provides users with more valuable time, and a level of information and infotainment provided to the users is increasing. Accordingly, sizes of internal displays for vehicles are gradually increasing, and the adoption of sliding or pop-up displays is increasing for an autonomous driving environment and a sense of front openness during driving.

FIGS. 1A and 1B illustrate display structure of a pop-up type according to the related art. FIG. 1A illustrates a front view and FIG. 1B illustrates a side view, and FIGS. 1A and 1B illustrate a state in which a display 20 is down and up, respectively. The display 20 is raised and lowered by a controller 40 and an actuator 30 that are disposed inside a vehicle cockpit 10.

It is important to accurately recognize a current position of a vehicle interior display for designing a rising or falling structure of the vehicle interior display, and as a basis for determining whether a motor should be continuously driven or stopped. According to the related art, as illustrated in FIGS. 1A and 1B, a physical position confirm is performed using a stop switch 50. The stop switch 50 is configured to be mounted so as to determine a position of a moving object (display) inside or outside an actuator. However, when the display 20 is raised upwards or at an intermediate point, there is a problem in that current position information may not be confirmed, and in order to confirm the position, it is necessary to raise the display 20 to the lower end and rearrange the display 20 to an initial position. For example, when a vehicle ignition is turned on, the display 20 is moved to the initial position to control the stop switch 50 to be pressed, and thus, an operation of confirming the physical position of the display 20 and then raising the display 20 needs to be performed. Therefore, there is a problem that the operation control process is not practical.

SUMMARY

The present invention provides a system and method for recognizing a position of an automotive display capable of accurately measuring a current position of the display without arranging a separate physical switch such as a stop switch, and accurately recognizing a rising/falling speed and controlling a left/right balance.

According to an aspect of the present invention, a system for recognizing a position of an automotive display includes: an automotive display having a touch sensor disposed on one side thereof; conductors that are disposed inside a vehicle cockpit to generate a change in capacitance for the touch sensor; and a control unit that obtains touch data according to the change in capacitance, analyzes a touch input pattern, and calculates position coordinate data and touch coordinate data of the automotive display.

The plurality of conductors may be disposed to be spaced apart from each other in a predetermined axial direction inside the vehicle cockpit.

The control unit may obtain a plurality of touch data, confirm a deviation between y coordinates included in the plurality of touch data, and calculate position coordinate data of the automotive display when the deviation between the y coordinates is within a preset range.

The control unit may acquire the plurality of touch data, confirms the deviation between the y coordinates included in the plurality of touch data, and calculate the touch coordinate data when there is data in which the deviation between the y coordinates is not within a preset range, and transmit a vehicle function execution command signal according to the corresponding touch input.

The conductor may be disposed in a bar shape over the entire area of the automotive display in a preset axial direction inside the vehicle cockpit.

The control unit may calculate the position coordinate data when the number of cells for forming sensitivity according to the change in capacitance is equal to or greater than a preset number and the deviation between the y coordinates of the touch data is within a preset range.

The control unit may calculate the touch coordinate data when the number of sensitivity forming cells according to the change in capacitance is equal to or greater than a preset number and there is data in which the deviation between the y coordinates is not within a preset range, and transmit the vehicle function execution command signal according to the touch input.

The control unit may further include a signal generation unit that generates a signal for confirming a position of the display, and obtain the touch data according to the change in capacitance formed by the conductor connected to the signal generation unit.

The signal generation unit may output the signal for confirming the position of the display synchronized with a transmission signal of the touch sensor transmitted in a touch period distinguished from a display period.

According to another aspect of the present invention, a method of recognizing a position of an automotive display performed by a system for recognizing a position of an automotive display includes: (a) receiving a touch signal obtained by a touch sensor disposed on one surface of an automotive display; (b) analyzing a touch input pattern using the touch signal and analyzing a deviation between y-axis coordinates; and (c) determining, as a touch signal formed by a conductor for confirming the position of the automotive display or a touch signal by a user input the touch signal received in step (a), by using the result of the analysis in step (b).

The conductor for positioning the automotive display may be disposed inside the vehicle cockpit and connected to a ground or a signal generation unit, and generate a changed in capacitance in the touch sensor.

In the step (a), when the conductor for positioning the automotive display is connected to the signal generation unit, the touch signal may be synchronized with the transmission signal of the touch sensor and may be formed by the signal for positioning the display output from the signal generation unit.

In the step (b), the touch signal may be used to confirm whether multi-touch corresponds to the number of conductors for positioning the automotive display, and in the step (c), when the deviation between the y-axis coordinates is within a preset range, the position coordinate data of the automotive display is calculated, and when there is data in which the deviation between the y coordinates is not within a preset range, touch coordinate data of the touch signal according to the user input may be calculated.

In the step (b), the touch signal may be used to confirm whether the number of touch sensor cells in which sensitivity is formed is equal to or greater than a preset number, and in the step (c), when the deviation between the y-axis coordinates is within a preset range, the position coordinate data of the automotive display is calculated, and when there is data in which the deviation between the y coordinates is not within a preset range, touch coordinate data of the touch signal according to the user input may be calculated.

According to still another aspect of the present invention, a system for recognizing a position of an automotive display includes: an input interface device that receives a touch signal obtained by a touch sensor disposed on one surface of an automotive display; a memory that stores a program for analyzing a touch input pattern using the touch signal and calculates position coordinate data and touch coordinate data of an automotive display; and a processor that executes the program, in which the processor determines the touch signal as a signal formed by a conductor for confirming the position of the automotive display or a signal formed by a user touch input.

The processor may confirm whether a multi-touch corresponding to the number of conductors for confirming the position of the automotive display is input, determine the touch signal as a signal formed by the conductor for confirming the position of the automotive display when the deviation between the y-axis coordinates of the touch signal is within a preset range, and calculate the position coordinate data of the automotive display.

The processor may confirm whether the number of touch sensor cells in which sensitivity is formed is equal to or greater than a preset number, determine the touch signal as a signal formed by the conductor for confirming the position of the automotive display when the deviation between the y-axis coordinates of the touch signal is within a preset range, and calculate the position coordinate data of the automotive display.

When there is data in which the deviation between the y-axis coordinates of the touch signal is not within a preset range, the processor may determine that the touch signal is a signal formed by the user's touch input, transmit a touch interrupt, and calculate the touch coordinate data to generate a vehicle function execution command.

BRIEF DESCRIPTION OF THE DRAWINGS

FIGS. 1A and 1B are diagrams illustrating a display structure of a pop-up type according to the related art.

FIGS. 3A and 3B are diagrams illustrating a system for recognizing a position of an automotive display using a conductor connected to a ground according to an embodiment of the present invention.

DETAILED DESCRIPTION OF EMBODIMENTS

The above-mentioned aspect, and other aspects, advantages, and features of the present disclosure and methods accomplishing them will become apparent from the following detailed description of exemplary embodiments with reference to the accompanying drawings.

However, the present invention may be modified in many different forms and it should not be limited to the exemplary embodiments set forth herein, and only the following embodiments are provided to easily inform those of ordinary skill in the art to which the present invention pertains the objects, configurations, and effects of the present invention, and the scope of the present invention is defined by the description of the claims.

Meanwhile, terms used in the present specification are for explaining exemplary embodiments rather than limiting the present invention. Unless otherwise stated, a singular form includes a plural form in the present specification. "Comprise" and/or "comprising" used in the present invention indicate(s) the presence of stated components, steps, operations, and/or elements but do(es) not exclude the presence or addition of one or more other components, steps, operations, and/or elements.

Figure 1B:
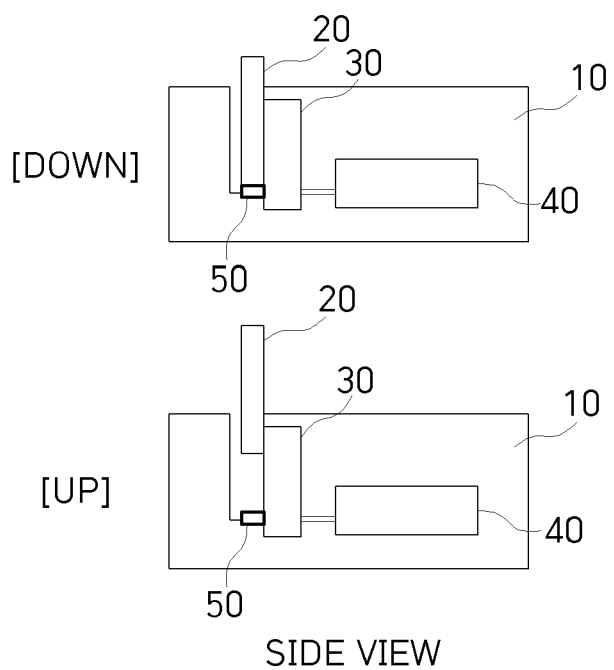
Figure 2:
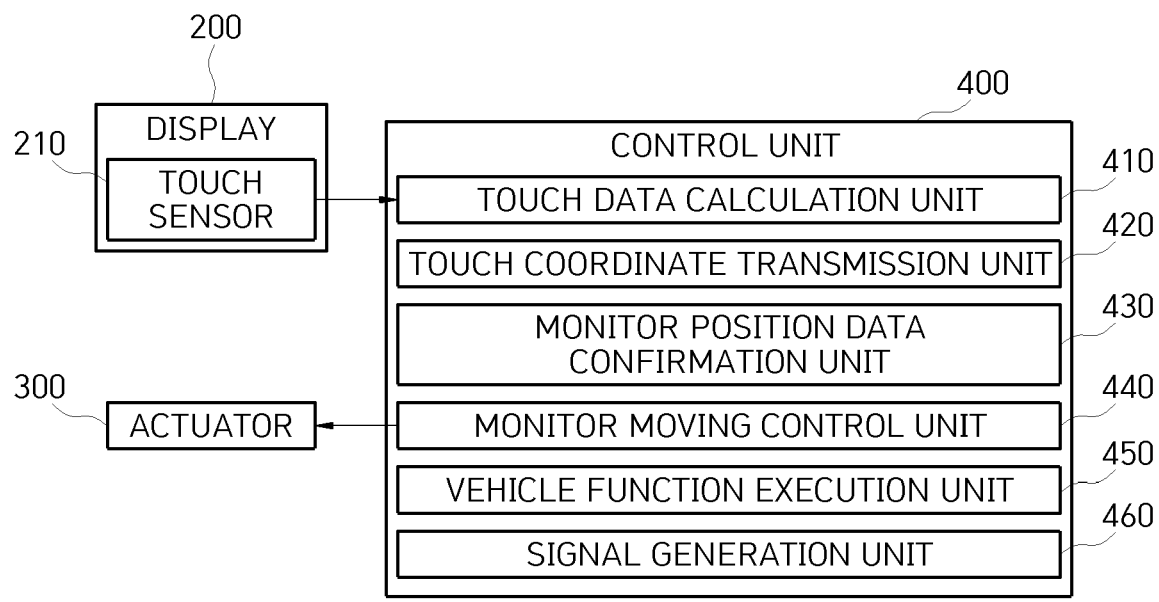
FIG. 2 is a diagram illustrating a system for recognizing a position of an automotive display according to an embodiment of the present invention.
Figure 3B:
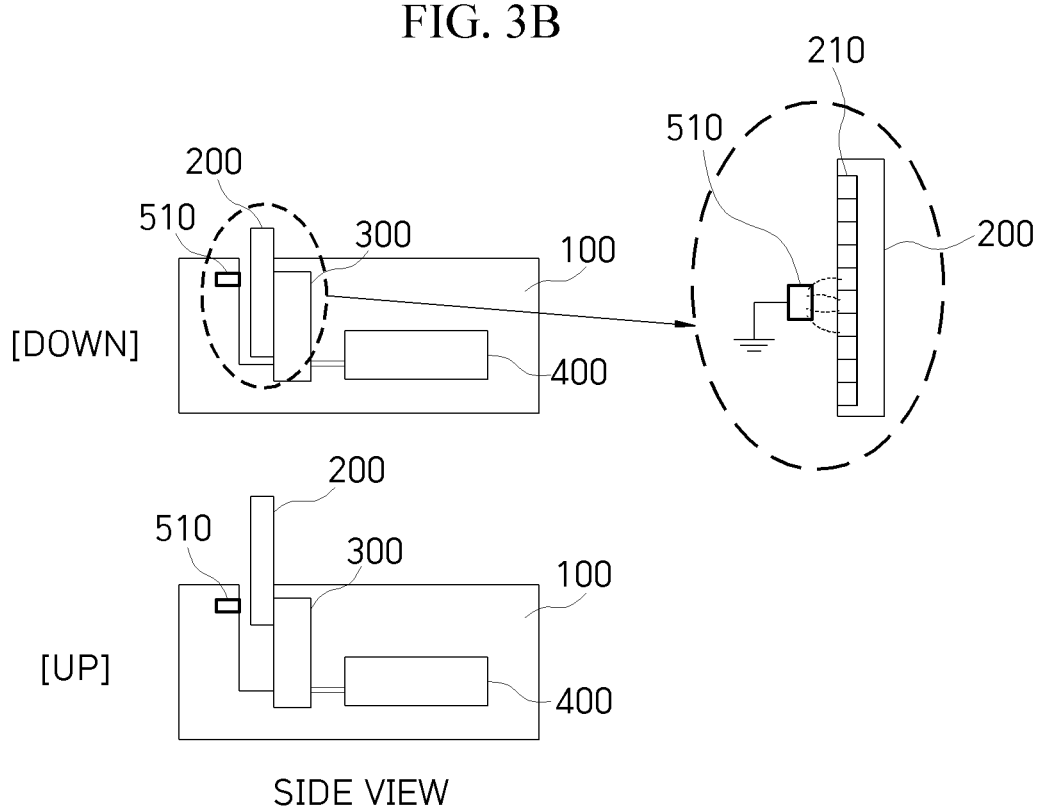
Figure 4A:
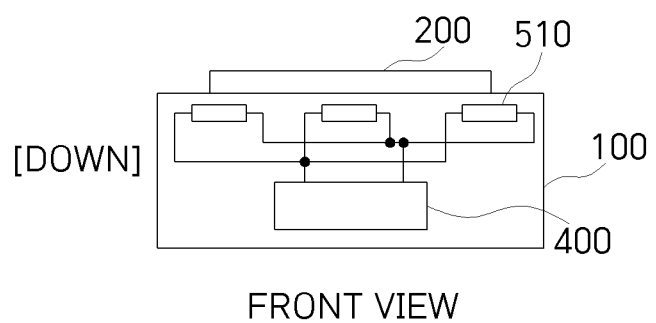
FIGS. 4A and 4B are diagrams illustrating a system for recognizing a position of an automotive display using a control unit connected to a ground according to another embodiment of the present invention.
Figure 4B:
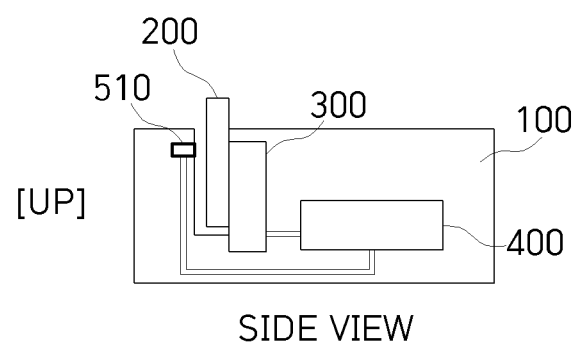
Figure 5:
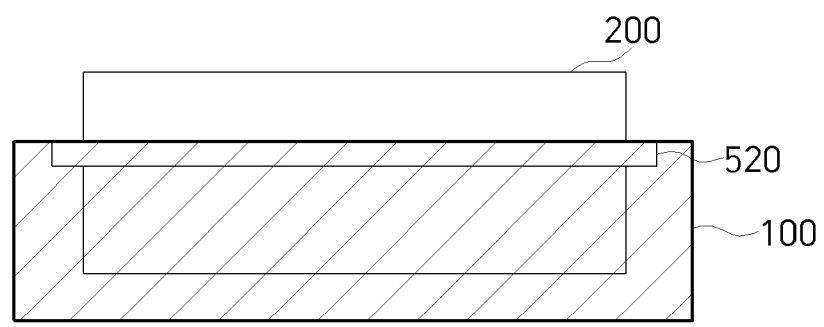
FIG. 5 is a diagram illustrating a position recognition system using a straight conductor according to another embodiment of the present invention.

FIG. 2 illustrates a system for recognizing a position of an automotive display according to an embodiment of the present invention, FIGS. 3A and 3B are diagrams illustrating a system for recognizing a position of an automotive display using a conductor connected to a ground according to an embodiment of the present invention, FIGS. 4A and 4B illustrate a system for recognizing a position of an automotive display using a control unit connected to a ground according to another embodiment of the present invention, and FIG. 5 illustrates a position recognition system using a straight conductor according to another embodiment of the present invention.

The display 200 is a display such as an OLED or an LCD in which a capacitive touch sensor 210 is built in, and is configured in various designs such as rollable and curved.

The actuator 300 raises and lowers the display 200, and is driven by a monitor moving control unit 440 of a control unit 400.

The control unit 400 includes a touch data calculation unit 410 that receives data from the touch sensor 210 and performs a touch data operation, a touch coordinate transmission unit 420 that transmits touch coordinates, a monitor position data confirmation unit 430 that uses a result of the touch data operation to confirm a current position of a monitor, and a vehicle function execution unit 450 that uses the result of the touch data operation to execute a preset vehicle function.

According to an embodiment of the present invention, when the vehicle ignition is turned on, the position of the display 200 is confirmed using the touch sensor 210 and the display is raised or lowered, so, when the stop switch is provided, it is possible to omit an operation of a separate actuator for determining the current position of the display.

The control unit 400 further includes a signal generation unit 460, and the signal generation unit 460 generates and outputs a signal for confirming the position of the display.

A conductor 510 is disposed inside a cockpit 100 to generate artificial sensitivity to the touch sensor 210 for confirming the position of the display. The conductor 510 is connected to a ground as illustrated in FIGS. 3A and 3B, or is connected to the control unit 400 as illustrated in FIGS. 4A and 4B.

Even if the conductor 510 and the touch sensor 210 are not in complete contact with each other, and thus, has a certain gap (usually within 1 mm) therebetween, according to the principle that a change in capacitance occurs, it is possible to accurately determine the current position of the display 200 moving up and down compared to the conductor 510 which is a fixed component inside the cockpit of the vehicle.

Regarding the conductor, the preset number (referring to FIGS. 3A, 3B 4A, 4B, three) of conductors 510 may be disposed, and as illustrated in FIG. 5, a straight conductor 520 in a bar shape may be disposed.

When the preset number of conductors 510 is disposed in a horizontal direction, as the touch sensitivity (change in capacitance) corresponding to the preset number is formed within a certain range, the touch sensor 210 transmits data in the positional coordinate data format to the control unit 400. The touch coordinate data format is "touch x00 y00 idxxxx", and the position coordinate data format is defined as "position x00 y00 idxxxx". The touch coordinate data is defined as coordinate data by a touch signal that is input for a vehicle function execution command by a user's hand, etc., and the position coordinate data is defined as coordinate data according to the change in capacitance formed by the conductor provided to confirm the position of the display In order to distinguish the position coordinate data from the touch coordinate data, the position coordinate data is excluded from the data recognition/transmission process at the time of the touch recognition interrupt. In this way, the control load due to continuous data transmission according to the formation of the sensitivity by the conductor 510 of the touch sensor 210 is reduced, and the distinction from the touch coordinate data is performed.

According to an embodiment of the present invention, it is possible to obtain horizontal reference left/right coordinates according to the touch coordinate recognition, and thus, it is possible to determine whether the display 200 is inclined with respect to a horizontal axis. That is, when the position coordinate data is "position left x00 y15" and "position right x00 y01", assuming that a y-coordinate has a difference of 15 pixels and a pixel pitch is 0.2 mm, the monitor position data confirmation unit 430 may determine that the left side of the display 200 is further raised by 3 mm compared to the right side, and the position may be corrected (that is, the actuator is driven using the monitor moving control unit) according to the left and right position determination or it may be determined whether the actuator is abnormal (when left/right balancing is not achieved even if the actuator is driven according to the preset command using the monitor moving control unit, it may be determined that the actuator is abnormal).

When the straight conductor 520 in the bar shape is disposed in the horizontal direction, as the touch sensitivity (change in capacitance) is formed in the entire range of the display in the horizontal direction, the touch sensor 210 converts the touch sensitivity to the control unit 400 in the position coordinate data format. That is, when the touch sensitivity equal to or greater than a certain range is formed in the horizontal direction, the corresponding coordinates are transmitted to the control unit 400 in the position coordinate data format. The touch coordinate data format is defined as "touch x00 y00 idxxxx", and the position coordinate data format is defined as "position x00 y00 idxxxx". As described above, in order to distinguish the touch coordinate data from the touch coordinate data, the position coordinate data is excluded from the recognition/transmission process at the time of the touch recognition interrupt, so it is possible to reduce the control load and distinguish the signal according to the continuous data transmission according to the formation of the sensitivity by the straight conductor 520 of the touch sensor 210.

In recognizing a multi-touch input situation, in the situation in which the deviation between vertical y-coordinates is greater than a preset range, it is determined that the situation is an abnormal situation (for example, a situation in which all five fingers are touched or the sensitivity is formed on the entire touch panel rather than positions of fingers for actual touch input due to static electricity, etc.) rather than forming the touch sensitivity for position confirmation using the conductor 510 or 520, and the function execution command according to the touch input is not transmitted. As another example, the touch data calculation unit 410 groups a plurality of touch signals obtained from the touch sensor 210, and performs grouping based on a preset range for the deviation between the y-coordinates. The vehicle function execution unit 450 receives the grouping result of the touch data calculation unit 410, and confirms that other touch signals are due to a touch input to a portion of the display 200 that protrudes outside the cockpit of the vehicle during the rising/lowering of the display 200 when it is confirmed that the plurality of touch signals corresponding to a grouped first group are touch signals according to the sensitivity formed by the conductor 510 or 520, and performs execution/end command recognition logic on the vehicle function by the corresponding touch input.

Referring to FIGS. 4A and 4B, the conductor 510 is connected to the control unit 400, and can increase a position recognition rate by linking the signal generated from the signal generation unit 460 of the control unit 400 with the display signal (Tx signal inside the touch panel). That is, by activating the signal generation unit 460 only when the position of the display needs to be confirmed, it is possible to increase the position recognition rate, and when the ground is used, it is possible to confirm the position of the display even when the compared gap is 5 mm or more.

Figure 6:
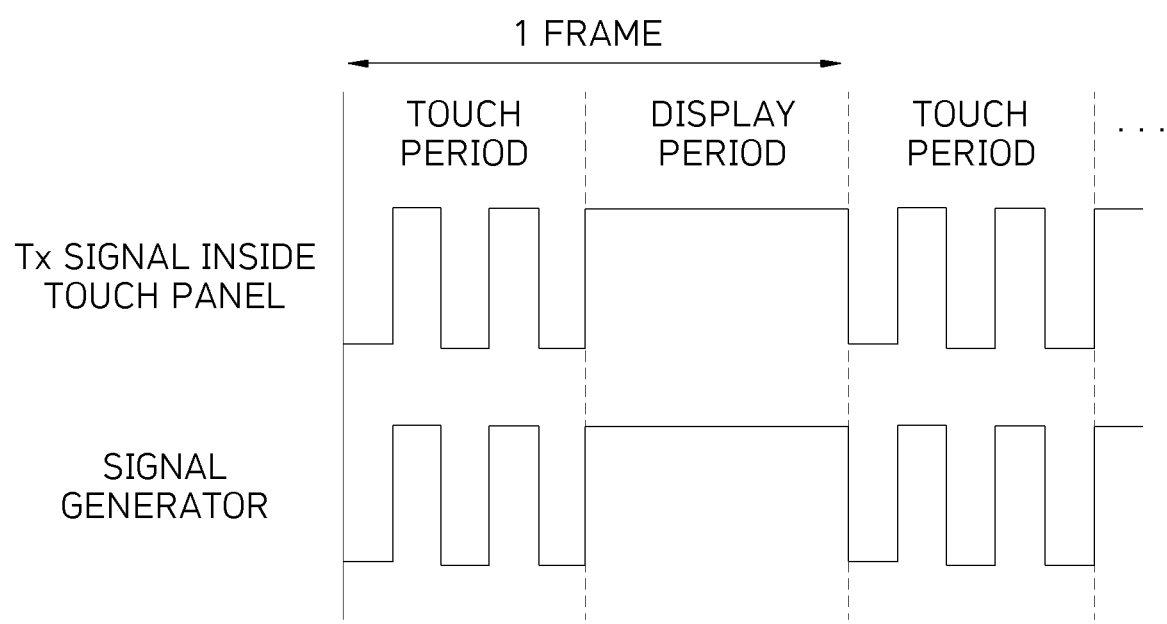
FIG. 6 is a diagram illustrating a transmission signal inside a touch panel and a signal generated from a signal generator according to another embodiment of the present invention.

FIG. 6 illustrates a transmission signal inside a touch panel and a signal generated from a signal generator according to another embodiment of the present invention.

The signal generated from the signal generation unit 460 is output in synchronization with the transmission signal (Tx signal) inside the touch panel, and a magnetic field formed in the conductor through which a current flows affects the touch sensor 210, so the recognition in the capacitive touch panel becomes possible. In the touch panel, a negative sensitivity different from that of a touch is formed, so it is possible to separately recognize a touch using a general finger. The separated data is transmitted to the control unit 400 in a preset format, the touch coordinate data format is defined as "touch x00 y00 idxxxx", and the position coordinate data format is defined as "position x00 y00 idxxxx". According to the above-described example, for synchronization with the transmission signal inside the touch panel, the signal generation unit 460 using a separate signal system is activated to perform the display position recognition.

Figure 7:
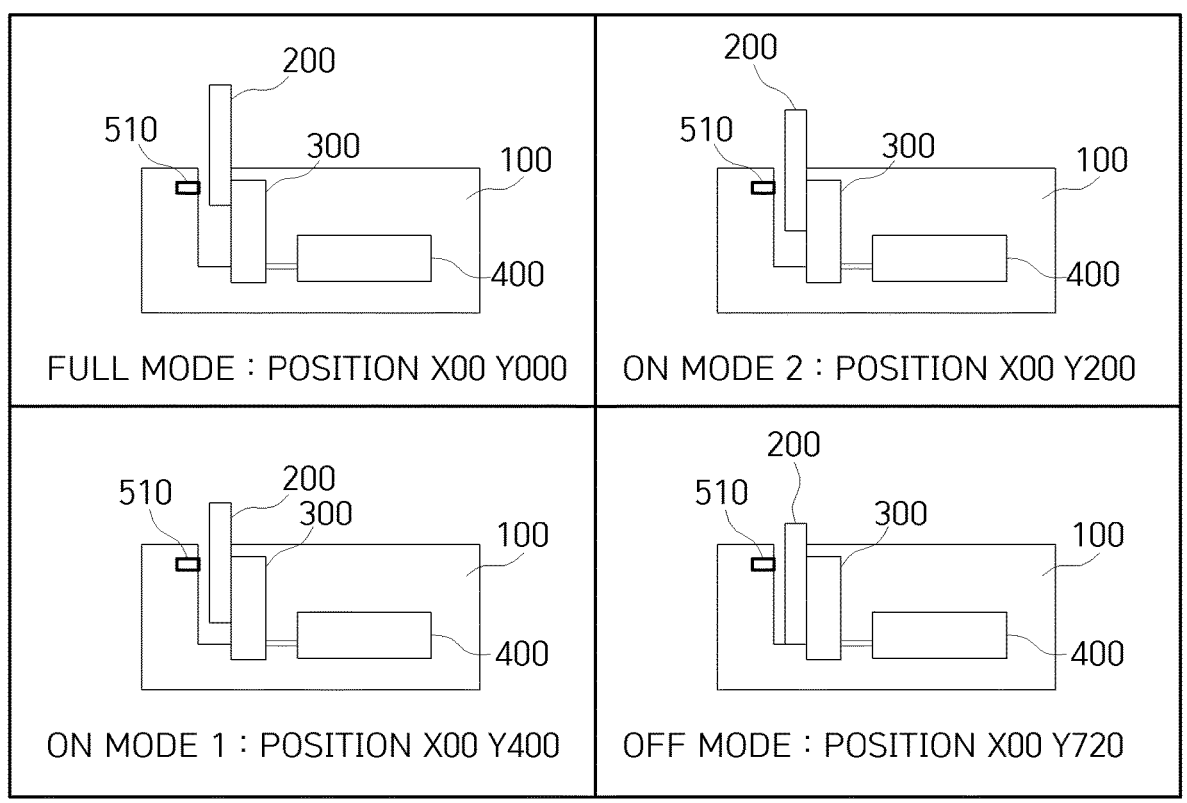
FIG. 7 is a diagram illustrating a touch coordinate utilization mode according to an embodiment of the present invention.

FIG. 7 illustrates a touch coordinate utilization mode according to an embodiment of the present invention.

According to the embodiment of the present invention, since the position of the display can be confirmed in real time, it is possible to set the position of the display in various modes as well as simple modes for on/off such as pop up and pop down.

For example, taking a display of 720 lines on the y-axis as an example, touch coordinates for a full mode are set to position x00 y000, touch coordinates for on mode 2 are set to position x00 y200, touch coordinates for on mode 1 are set to position x00 y400, touch coordinates for an off mode are set to position x00 y720, and it is possible to perform a mode operation.

Figure 8:
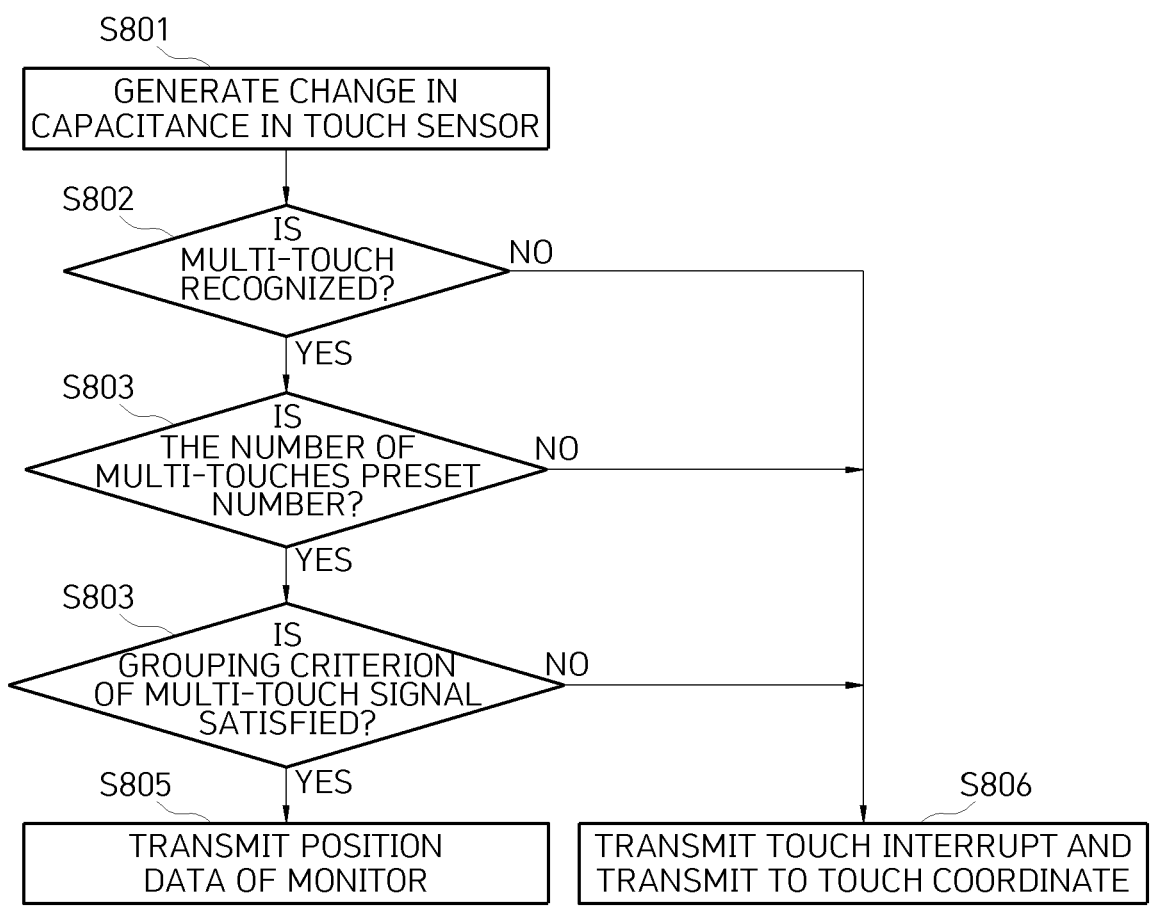
FIG. 8 is a diagram illustrating a method of recognizing a position of an automotive display according to an embodiment of the present invention.

FIG. 8 illustrates a method of recognizing a position of an automotive display according to an embodiment of the present invention, and illustrates a method of recognizing a position using three conductors connected to a ground.

In step S801, the touch signal is received from the touch sensor due to the occurrence of the change in capacitance.

In step S802, it is confirmed whether the multi-touch is recognized using the touch signal.

In step S802, when the multi-touch is not recognized, the touch interrupt is transmitted and the touch coordinate data is transmitted to the control unit according to the obtained touch signal operation result (S806).

When the multi-touch is recognized in step S802, it is confirmed in step S803 whether the number of multi-touches is a preset number. As illustrated in FIGS. 3A and 3B, when three conductors 510 are disposed in the horizontal direction, it is confirmed in step S803 whether the number of multi-touches is three.

If it is determined in step S803 that the number of multi-touches is not the preset number, step S806 is performed.

If it is determined in step S803 that the number of multi-touches is the preset number, it is confirmed in step S804 whether the grouping criterion of the multi-touch signal is satisfied. In this case, the grouping criterion is to confirm whether the deviation between the y-coordinates of the plurality of multi-touch input signals is within a preset range (e.g., 3 mm).

If it is determined in step S804 that the grouping criterion of the multi-touch signal is not satisfied, step S806 is performed.

If it is confirmed in step S804 that the grouping criterion of the multi-touch signal is satisfied, the position data of the monitor (display) is transmitted (S805). In this case, it is possible to transmit the position coordinate data as much as the number (three) of recognition or selectively transmit two data of the outer periphery.

Figure 9:
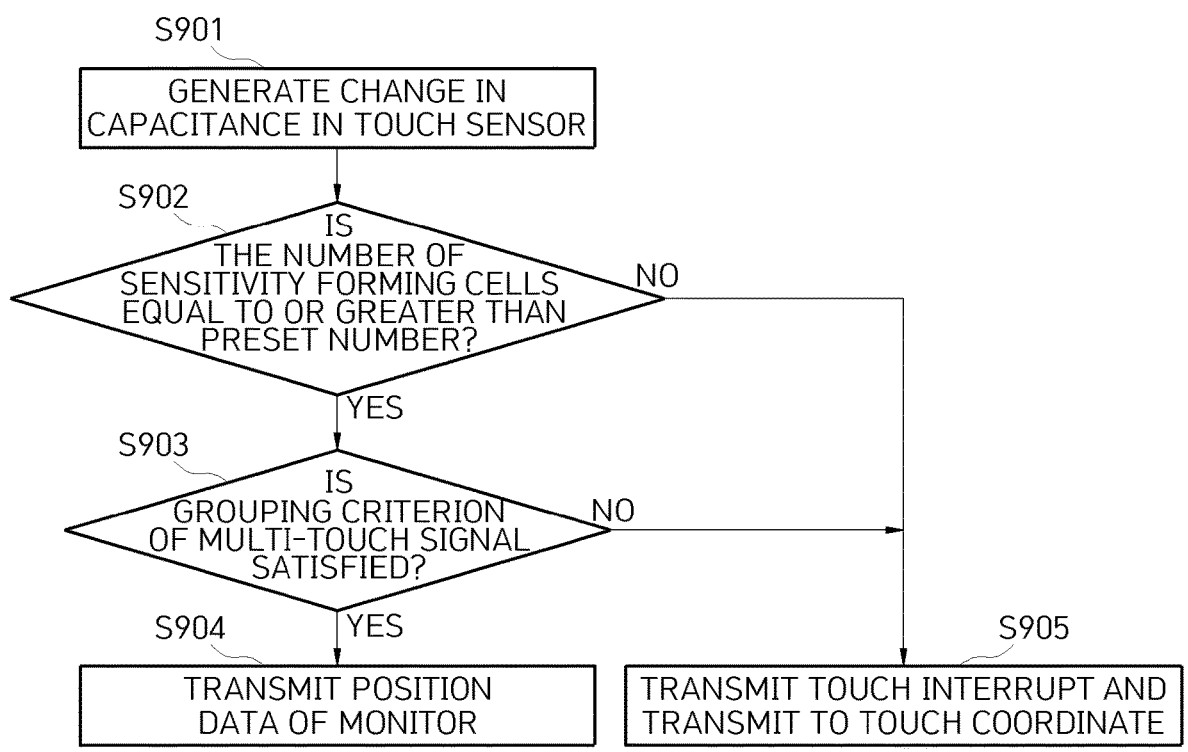
FIG. 9 is a diagram illustrating a method of recognizing a position of an automotive display using a straight conductor according to another embodiment of the present invention.

FIG. 9 is a method of recognizing a position of an automotive display using a straight conductor according to another embodiment of the present invention, and illustrates a method of recognizing a position using a single bar-type conductor connected to a ground.

In step S901, the touch signal is received from the touch sensor due to the occurrence of the change in capacitance.

In step S902, it is confirmed whether the number of cells in which the sensitivity is formed is equal to or greater than the preset number. For example, it is confirmed whether the number of cells in which the sensitivity is formed is 10 or more.

In step 902, when the number of cells in which the sensitivity is formed is less than the preset number, the touch interrupt is transmitted and the touch coordinate data is transmitted to the control unit according to the result of the obtained touch signal operation (S905).

In step S902, if the number of cells for which the sensitivity is formed is equal to or greater than the preset number, it is confirmed in step S903 whether the grouping criterion of the multi-touch signal is satisfied. In this case, the grouping criterion is to confirm whether the deviation between the y-coordinates of the plurality of multi-touch input signals is within the preset range (e.g., 3 mm).

If it is determined in step S903 that the grouping criterion of the multi-touch signal is not satisfied, step S905 is performed.

If it is confirmed in step S903 that the grouping criterion of the multi-touch signal is satisfied, the position data of the monitor (display) is transmitted (S904). In this case, as for the position coordinate data, one representative data is transmitted (the x-axis coordinate data may be ignored and the common y-axis coordinate may be transmitted as representative data), or the plurality of position coordinate data having the largest y-coordinate deviation is transmitted as basis data for left/right balancing adjustment.

Figure 10:
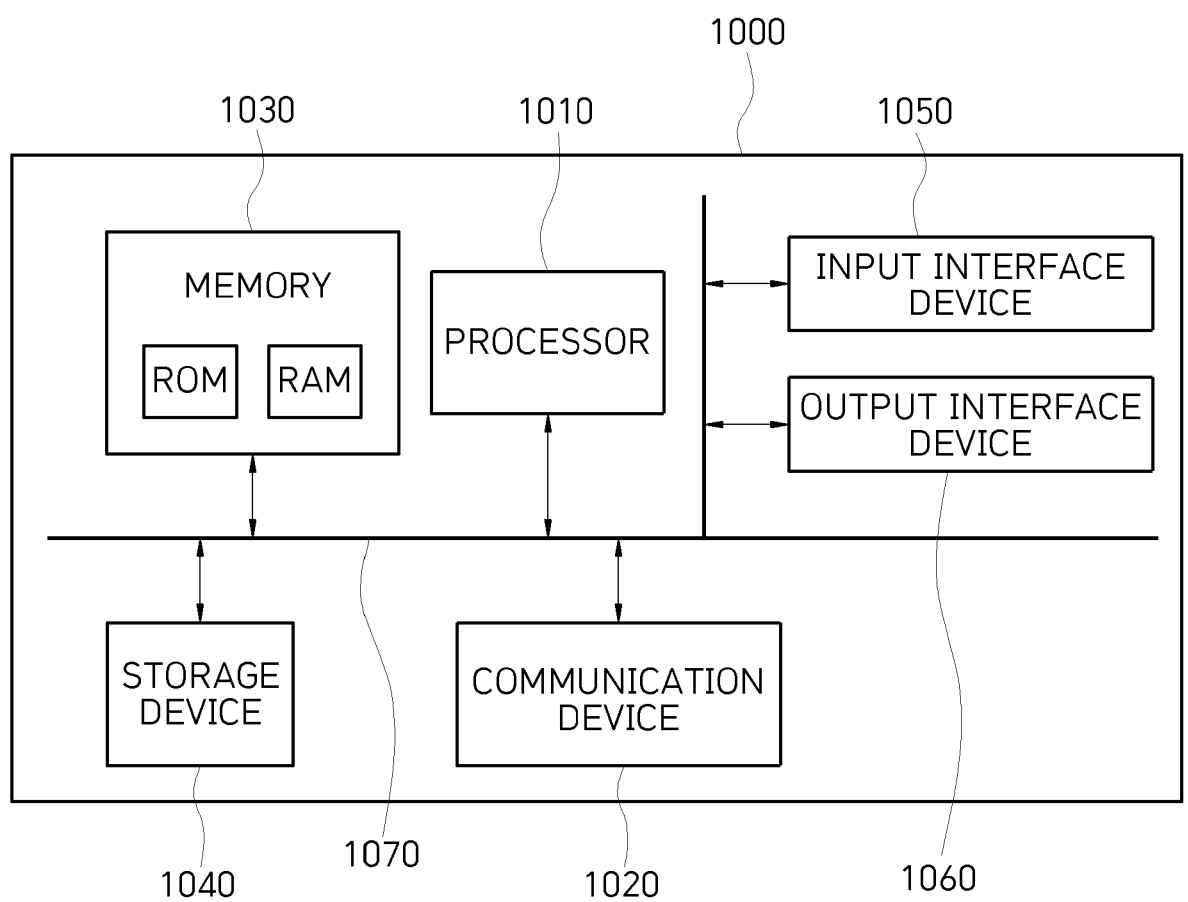
FIG. 10 is a block diagram illustrating a computer system for implementing the method according to the embodiment of the present invention.

FIG. 10 is a block diagram illustrating a computer system for implementing the method according to the embodiment of the present invention.

The system for recognizing a position of an automotive display according to the present invention is an input interface device 1050 that receives a touch signal obtained by a touch sensor disposed on one surface of the automotive display, a memory 1030 in which a program for analyzing a touch input pattern using a touch signal and calculating position coordinate data and touch coordinate data of the automotive display is stored, and a processor 1010 that executes a program, in which the processor 1010 determines the touch signal as the signal formed by the conductor for confirming the position of the automotive display or the signal formed by the user touch input.

The processor 1010 confirms whether the multi-touch corresponding to the number of conductors for confirming the position of the automotive display is input, determines the touch signal as the signal formed by the conductor for confirming the position of the automotive display when the deviation between the y-axis coordinates of the touch signal is within the preset range, and calculates the position coordinate data of the automotive display.

The processor 1010 confirms whether the number of touch sensor cells in which the sensitivity is formed is equal to or greater than the preset number, determines the touch signal as the signal formed by the conductor for confirming the position of the automotive display when the deviation between the y-axis coordinates of the touch signal is within the preset range, and calculates the position coordinate data of the automotive display.

When there is data in which the deviation between the y-axis coordinates of the touch signal is not within the preset range, the processor 1010 determines the touch signal as the signal formed by the user touch input to transmit the touch interrupt, and calculates the touch coordinate data to generate the vehicle function command.

Referring to FIG. 10, a computer system 1000 may include at least one of a processor 1010, a memory 1030, an input interface device 1050, an output interface device 1060, and a storage device 1040 that communicate through a bus 1070. The computer system 1000 may also include a communication device 1020 coupled to a network. The processor 1010 may be a central processing unit (CPU) or a semiconductor device that executes instructions stored in the memory 1030 or the storage device 1040. The memory 1030 and the storage device 1040 may include various types of volatile or non-volatile storage media. For example, the memory may include a read only memory (ROM) and a random access memory (RAM). In the embodiment of the present disclosure, the memory may be located inside or outside the processor, and the memory may be connected to the processor through various known means. The memory may be various types of volatile or non-volatile storage media, and the memory may include, for example, a ROM or a RAM.

Accordingly, the embodiment of the present invention may be implemented as a computer-implemented method, or as a non-transitory computer-readable medium having computer-executable instructions stored thereon. In one embodiment, when executed by the processor, the computer-readable instructions may perform a method according to at least one aspect of the present disclosure.

The communication device 1020 may transmit or receive a wired signal or a wireless signal.

In addition, the method according to the present invention may be implemented in a form of program instructions that may be executed through various computer means and may be recorded in a computer-readable recording medium.

The computer-readable recording medium may include a program instruction, a data file, a data structure or the like, alone or a combination thereof. The program instructions recorded in the computer-readable recording medium may be configured by being especially designed for the embodiment of the present invention, or may be used by being known to those skilled in the field of computer software. The computer-readable recording medium may include a hardware device configured to store and execute the program instructions. Examples of the computer-readable recording medium may include a magnetic medium such as a hard disk, a floppy disk, and a magnetic tape, optical media such as a compact disk read only memory (CD-ROM) or a digital versatile disk (DVD), a magneto-optical medium such as a floptical disk, a ROM, a RAM, a flash memory, or the like. Examples of the program instructions may include a high-level language code capable of being executed by a computer using an interpreter, or the like, as well as a machine language code made by a compiler.

According to the present invention, it is possible to accurately measure a position of a display through touch sensor recognition and infotainment control logic by replacing a physical switch, such as a stop switch in a structure in which an automotive display moves, with a sliding type, pop-up type, a rollable type, and the like, and adjusting a left/right balance.

The effects of the present invention are not limited to those mentioned above, and other effects not mentioned can be clearly understood by those skilled in the art from the following description.

Although embodiments of the present invention have been described in detail hereinabove, the scope of the present invention is not limited thereto, but may include several modifications and alterations made by those skilled in the art using a basic concept of the present invention as defined in the claims.

What is claimed is:

1. A system for detecting a position of a touch screen display movable in a vehicle, comprising:
    a capacitive touch sensor disposed at a surface of the touch screen display and configured to receive a touch input by a user, the touch input causing a first change in capacitance at the capacitive touch sensor;
    a plurality of conductors disposed at a surface of a vehicle cockpit facing the surface of the touch screen display and causing a second change in capacitance at the capacitive touch sensor when the touch screen display moves; and
    a control unit configured to:
        obtain touch data based on the first change in capacitance at the capacitive touch sensor caused by the touch input, and generate, based on the obtained touch data, touch coordinate data indicating coordinates of the touch input by the user;
        generate, based on the second change in capacitance at the capacitive touch sensor caused by a movement of the touch screen display, position coordinate data indicating coordinates of the touch screen display including horizontal left and right coordinates of the touch screen display; and
        determine, based on the horizontal left and right coordinates of the touch screen display, whether the touch screen display is horizontally inclined.

2. The system of claim 1, wherein the plurality of conductors are spaced apart from each other.

3. The system of claim 2, wherein the control unit is further configured to:
    obtain a plurality of touch data pieces including a plurality of y coordinates of the touch input;
    confirm a deviation between the plurality of y coordinates; and
    calculate the position coordinate data of the touch screen display when the deviation between the plurality of y coordinates is within a preset range.

4. The system of claim 2 wherein the control unit is further configured to:
    acquire a plurality of touch data pieces including a plurality of y coordinates of the touch input;
    determine a deviation between the plurality of y coordinates;
    calculate the touch coordinate data when a deviation between the plurality of y coordinates is not within a preset range; and
    transmit a vehicle function execution command signal according to the touch input.

5. The system of claim 1, wherein the control unit is further configured to calculate the position coordinate data when a number of sensitivity forming cells according to the second change in capacitance is equal to or greater than a preset number of cells and a deviation between a plurality of y coordinates of the touch data is within a preset range.

6. The system of claim 1, wherein the control unit is further configured to:
    calculate the touch coordinate data when a number of sensitivity forming cells according to the first change in capacitance is equal to or greater than a preset number and a deviation between a plurality of y coordinates of the touch data is not within a preset range; and transmit a vehicle function execution command signal according to the touch input.

7. The system of claim 1, wherein the control unit further includes a signal generation unit connected to the plurality of conductors configured to generate a conformation signal for confirming a position of the touch screen display, and acquire the touch data according to the change in capacitance caused by the conductors.

8. The system of claim 7, wherein the conformation signal includes a touch period and a display period and is synchronized with a transmission signal of the capacitive touch sensor transmitted during the touch period.

9. A method of detecting a position of a touch screen display movable in a vehicle, comprising:
receiving, from a capacitive touch sensor disposed at a surface of the touch screen display, a first change in capacitance at the capacitive touch sensor caused by a user's touch input to the touch screen display;
generating, based on the received first change in capacitance at the capacitive touch sensor, touch coordinate data indicating coordinates of the user's touch input to the touch screen display;
receiving, from the capacitive touch sensor, a second change in capacitance at the capacitive touch sensor caused by a plurality of conductors disposed at a surface of a vehicle cockpit facing the surface of the touch screen display when the touch screen display moves;
generating, based on the second change in capacitance at the capacitive touch sensor, position coordinate data indicating coordinates of the touch screen display including horizontal left and right coordinates of the touch screen display; and
determining, based on the horizontal left and right coordinates of the touch screen display, whether the touch screen display is horizontally inclined.

10. The method of claim 9, further comprising:
obtaining a plurality of touch data pieces including a plurality of y coordinates of the user's touch input;
confirming a deviation between the plurality of y coordinates; and
calculating the position coordinate data of the touch screen display when the deviation between the plurality of y coordinates is within a preset range.

11. The method of claim 9, further comprising:
acquiring a plurality of touch data pieces including a plurality of y coordinates of the touch input;
determining a deviation between the plurality of y coordinates; and
calculating the touch coordinate data when a deviation between the plurality of y coordinates is not within a preset range.

12. The method of claim 9, wherein the position coordinate data is generated when a number of sensitivity forming cells sensitivity according to the second change in capacitance is equal to or greater than a preset number of cells and a deviation between a plurality of y coordinates of the touch data is within a preset range.

13. The method of claim 9, wherein the touch coordinate data is generated when a number of sensitivity forming cells according to the first change in capacitance is equal to or greater than a preset number and a deviation between a plurality of y coordinates of the touch data is not within a preset range.

14. The method of claim 9, further comprising generating a confirmation signal confirming a position of the touch screen display, the conformation signal including a touch period and a display period and being synchronized with a transmission signal of the capacitive touch sensor transmitted during the touch period.

15. A system for detecting a position of a touch screen display movable in a vehicle, comprising:
a capacitive touch sensor disposed at a surface of the touch screen display and configured to receive a touch input by a user, the touch input causing a first change in capacitance at the capacitive touch sensor;
a plurality of conductors disposed at a surface of a vehicle cockpit facing the surface of the touch screen display and causing a second change in capacitance at the capacitive touch sensor when the touch screen display moves;
a processor; and
a non-transitory computer-readable medium storing executable instructions which, when executed by the processor, cause the processor to control the system to perform:
receiving, from a capacitive touch sensor disposed at a surface of the touch screen display, a first change in capacitance at the capacitive touch sensor caused by a user's touch input to the touch screen display;
generating, based on the received first change in capacitance at the capacitive touch sensor, touch coordinate data indicating coordinates of the user's touch input to the touch screen display;
receiving, from the capacitive touch sensor, a second change in capacitance at the capacitive touch sensor caused by a plurality of conductors disposed at a surface of a vehicle cockpit facing the surface of the touch screen display when the touch screen display moves;
generating, based on the second change in capacitance at the capacitive touch sensor, position coordinate data indicating coordinates of the touch screen display including horizontal left and right coordinates of the touch screen display; and
determine, based on the horizontal left and right coordinates of the touch screen display, whether the touch screen display is horizontally inclined.

16. The system of claim 15, wherein the instructions, when executed by the processor, further cause the processor to control the system to perform:
obtaining a plurality of touch data pieces including a plurality of y coordinates of the user's touch input;
confirming a deviation between the plurality of y coordinates; and
calculating the position coordinate data of the touch screen display when the deviation between the plurality of y coordinates is within a preset range.

17. The system of claim 15, wherein the instructions, when executed by the processor, further cause the processor to control the system to perform:
acquiring a plurality of touch data pieces including a plurality of y coordinates of the touch input;
determining a deviation between the plurality of y coordinates; and
calculating the touch coordinate data when a deviation between the plurality of y coordinates is not within a preset range.

18. The system of claim 15, wherein the position coordinate data is generated when a number of sensitivity forming cells sensitivity according to the second change in capacitance is equal to or greater than a preset number of cells and a deviation between a plurality of y coordinates of the touch data is within a preset range.

19. The system of claim 15, wherein the touch coordinate data is generated when a number of sensitivity forming cells according to the first change in capacitance is equal to or greater than a preset number and a deviation between a plurality of y coordinates of the touch data is not within a preset range.

20. The system of claim 15, wherein the instructions, when executed by the processor, further cause the processor to control the system to perform generating a confirmation signal confirming a position of the touch screen display, the conformation signal including a touch period and a display period and being synchronized with a transmission signal of the capacitive touch sensor transmitted during the touch period.

* * * * *